United States Patent [19]

Willersinn et al.

[11] 3,853,461

[45] Dec. 10, 1974

[54] ETHERIFICATION OF COMPOUNDS BEARING ALCOHOLIC HYDROXYL GROUPS

[75] Inventors: Herbert Willersinn; Hermann Gausepohl; Herbert Naarmann; Karl-Ruediger Hellwig, all of Ludwigshafen, Germany

[73] Assignee: Badische Anilin- & Soda-Fabrik Aktiengesellschaft, Ludwigshafen/Rhein, Germany

[22] Filed: Dec. 8, 1971

[21] Appl. No.: 206,171

[30] Foreign Application Priority Data
Dec. 10, 1970   Germany............................ 2060805
Mar. 23, 1971   Germany...................... 2114079

[52] U.S. Cl............................ 8/189, 8/115.5, 8/120, 8/127.6, 96/36, 117/93, 260/33.6 UA, 260/33.8 UA, 260/315, 260/692

[51] Int. Cl..................... D06m 13/36, D06m 13/38

[58] Field of Search............... 8/115.5, 116.2, 127.6, 8/DIG. 18, 189; 117/93; 260/692

[56] References Cited
UNITED STATES PATENTS

| 3,088,791 | 5/1963 | Cline et al. ........................... 8/115.5 |
| 3,131,138 | 4/1964 | Durup et al................ 204/159.18 X |
| 3,179,485 | 4/1965 | Kawasaki............................ 8/115.5 |
| 3,227,510 | 1/1966 | Bridgeford........................ 8/115.5 X |
| 3,514,385 | 5/1970 | Magat et al...................... 8/116.2 X |

Primary Examiner—Richard D. Lovering
Attorney, Agent, or Firm—Johnston, Keil, Thompson & Shurtleff

[57] ABSTRACT

Etherification of compounds bearing alcoholic hydroxyl groups by causing ethylenically unsaturated compounds to act on the hydroxyl-bearing compounds under the action of high-energy radiation and the presence of organic halogen compounds.

6 Claims, No Drawings

ETHERIFICATION OF COMPOUNDS BEARING ALCOHOLIC HYDROXYL GROUPS

It is well known that ethers may be prepared by the use of classical reactions known in the art. For example, the preparation of ether compounds is described in Organikum VEB, Deutscher Verlag der Wissenschaften. It is also revealed in Preparative Organic Photochemistry by A. Schönberg, Springer Verlag, Berlin, Heidelberg, New York, 1968, that ethers may be obtained by irradiating mixtures of alcohols and olefins. However, this method produces yields of less than 10% of theory with irradiation periods of more than three weeks.

Since etherification reactions are very important in many chemical fields and applications, there has been a need for an industrial process which enables such etherification to be carried out in such a manner that yields of substantially 100% are produced in a minimum amount of time (less than 30 seconds).

It is an object of the invention to provide a general process for the etherification of compounds bearing alcoholic hydroxyl groups by the action of ethylenically unsaturated compounds on said hydroxyl-bearing compounds. A particular object of the invention is the use of said process for rendering hydrophobic all materials having chemical structures based on high molecular weight compounds bearing alcoholic groups. Another specific object of the invention is the use of the said process for the preparation of photocopies.

We have found a process for the etherification of compounds bearing alcoholic hydroxyl groups by the action of ethylenically unsaturated compounds on said hydroxyl-bearing compounds under the action of high-energy radiation, by means of which said etherification can be effected in extremely short times with yields of nearly 100%. Our new process is characterized in that the compounds bearing alcoholic hydroxyl groups are reacted with tertiary amines of formula I:

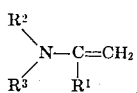

in which $R^1$ denotes hydrogen or methyl and $R^2$ and $R^3$ are the same or different and denote aromatic radicals or together form a heterocyclic ring in which either a carbonyl function is present as a ring member in at least one of the $\alpha$-positions to the nitrogen atom or an aromatic ring is fused in at least one of the $\alpha,\beta$-positions to the nitrogen atom, said reaction being carried out in the presence of organic halogen compounds containing one or more halogen atoms attached to aliphatic carbon atoms.

In one advantageous embodiment of the process of the invention, the above reaction is carried out in the presence of auxiliary liquids which are inert to the reactants under the conditions of the reaction and which boil in the range 25° to 180°C.

In further advantageous embodiments, the reaction is carried out not only in the presence of the said auxiliary liquids but also in the presence of auxiliary polymers or copolymers. In a still further embodiment, there are added to the reactants not only the said halogenated organic compounds but also known photosensitizers.

The starting materials for use in the process of the invention are compounds which bear alcoholic groups. It is to be understood that this class of substances comprises all high and low molecular weight compounds answering to this definition, which may or may not be substituted by other groups, provided the substituents do not interfere with the course of the reaction or change its direction. In addition, the compounds may contain further groups in their molecule, for example ether, imide, ester, thioether, thioester or glucosido radicals and/or other divalent radicals.

Examples of suitable classes of compounds are as follows: low molecular weight alcohols, such as monohydric, aliphatic, saturated or unsaturated alcohols of from 1 to 8 carbon atoms; monohydric araliphatic alcohols of from 7 to 20 carbon atoms in which the hydroxyl group is attached to one of the aliphatic carbon atoms; polyhydric alcohols of from 2 to 12 carbon atoms; high molecular weight compounds containing alcoholic hydroxyl groups, such as polyvinyl alcohols; sugar derivatives such as cellulose or starch; hydroxyl-containing proteins; and polyesters containing some free hydroxyl groups.

Other suitable alcohols are naturally occuring alcohols such as terpene alcohols or steroids.

Particularly suitable low molecular weight saturated or unsaturated alcohols for the process of the invention are, for example, methanol, ethanol, n-propanol, isopropanol, allyl alcohol, crotyl alcohol, n-butanol, isobutanol, s-butanol, t-butanol, n-amyl alcohol, isoamyl alcohol, t-amyl alcohol, neopentyl alcohol, cyclopentanol, n-hexyl alcohol, cyclohexanol, n-octanol, benzhydrol, benzyl alcohol, phenylethyl alcohol, phenylpropyl alcohol, phenylbutyl alcohol and triphenyl carbinol.

Suitable polyhydric alcohols of from 2 to 12 carbon atoms are those carrying a hydroxyl groups on each carbon atom and also those in which hydroxyl groups are attached only to individual CH units.

Specific examples are ethylene glycol, 1,2-propanediol, 1,3-propanediol, 1,3-butanediol, 1,4-butanediol, 2,3-butanediol, 1,5-pentanediol, 1,6-hexanediol, pinacol, glycerol, 1,2,4-butanetriol, 1,2,6-hexanetriol, hexitols and pentaerythritol.

Suitable alcohol group-bearing compounds containing in the molecule not only hydroxyl groups but also other, inert groups or one of the said divalent radicals are, for example, chlorinated alcohols such as mono-, di- and tri-chloroethanol, hydroxyvinyl thioether, glycol ether, glycerine ether and mono-, di- and trialkanolamines. Compounds containing, for example, aldehyde groups or cyclic ether groupings, of which the sugars and sugar derivatives may be mentioned by way of example, are also suitable for the process of the invention.

Particular examples of the high molecular weight compounds containing alcoholic hydroxyl groups are the naturally occurring hydroxy-bearing compounds such as the high molecular weight derivatives of sugars, for example cellulose or starch, and also hydroxyl-containing proteins which contain, for example, the amino acid hydroxyproline or serine as building block.

Synthetically obtained polymeric compounds containing alcoholic hydroxyl groups, such as polyvinyl alcohols and polyesters containing some free hydroxyl groups, for example polyethylene glycol maleate having a sufficiently large hydroxyl value, may also be etherified by the process of the invention.

Derivatives of such high molecular weight compounds containing alcoholic hydroxyl groups that occur naturally or are synthetically obtainable may also be treated by the etherification of the invention. Examples thereof are cellulose, high molecular weight proteins and also plastics materials based on polyvinyl alcohols or on the above polyesters and varnishes composed of hydroxyl-containing compounds. Specific examples are cellulose, for example in the form of cotton or in a processed form such as paper; and, of the proteins leather substantially composed of collagen which in turn contains, as the main building block, the essential amino acid hydroxyproline. Of the fibrous cellulosic materials, wood is also suitable.

The plastics materials manufactured from synthetic polymers are manifold and are primarily represented, for the purpose of the invention, by all possible surface coatings.

The ethylenically unsaturated compounds are represented in the invention by tertiary amines of formula I. From the chemical point of view, the above-defined representatives of this class of substances are those in which basically at least one and not more than two of the carbon atoms directly attached to an amino nitrogen atom carry a double bond which is satisfied either by another carbon atom or by an oxygen atom. In the former case, the double bond may be of an aliphatic or, preferably, aromatic nature.

Where the tertiary amine is a heterocyclic compound, as is possible according to the definition of $R^2$ and $R^3$ in formula I, at least one of the $\alpha$-ring members is a carbonyl group or the starting atom for an $\alpha,\beta$-fused aromatic ring.

Specific examples of the tertiary amines which may be used in the process of the invention are vinyl diphenylamine, vinyl phenylmethylamine, vinyl dinaphthylamine, mono- or di-acyl vinyl amines generally, heterocyclic compounds such as representatives in which the grouping

obeys the following formula:

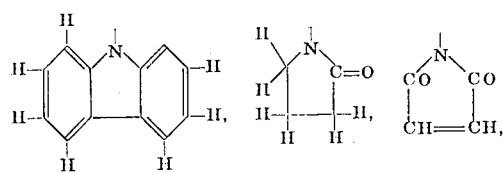

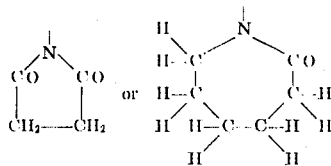

Particularly significant representatives are those in which the group

obeys the above formulae, of which vinyl carbazole and vinylpyrrolidone are industrially particularly important starting materials for the process of the invention.

In the present invention, the organic halogen compounds are not to be regarded as starting materials but as essential additives, which halogen compounds contain halogen atoms attached to one or more aliphatic carbon atoms. Such halogenated compounds, which may also contain other substituents which are inert to the reaction, for example sulfo or nitro groups and heterocyclic radicals, include those compounds which contain in the molecule at least 1 halogen atom, for example a chlorine, bromine or iodine atom, forming part of an aliphatic bond. Preferably, these compounds contain at least two or three halogen atoms per molecule. Apart from the aforementioned substituents which are inert to the reaction, these compounds may also be substituted by hydroxyl or carboxyl groups. Particular examples of such halogen compounds are aliphatic and araliphatic halogen compounds which contain the chlorine, bromine or iodine in the aliphatic side-chain. Specific examples are methyl chloride, methyl bromide, methyl iodide, methylene chloride, methylene bromide, chloroform, bromoform, iodoform, carbon tetrachloride, carbon tetrabromide, tetra-iodo-ethane, ethyl chloride, ethyl bromide, ethyl iodide, 1,2-dichloro-ethane, 1,2-dibromo-ethane, 1,2-di-iodo-ethane, 1,2,3-trichloro-ethane, 1,2,3,4-tetrachloro-ethane, hexachloroethane and/or the corresponding bromides and/or iodides, also araliphatic, benzyl iodide, benzylidene bromide, benzylidene iodide, decachlordiphenyl, decabromodiphenyl, decachlorodiphenyl oxide, decabromodiphenyl oxide, $\alpha$-iodo-acetic acid, $\beta$-bromopropionic acid and $\beta$-chloropropionic chloride.

Other suitable compounds are the corresponding monosubstituted to fully substituted halopropanes, halobutanes and halopentanes optionally substituted by aromatic radicals. Examples of those substituted by other groups are trichloro-ethanol, trichloro-acetic acid and trichloro-acetaldehyde and the corresponding bromo or iodo homologs. However, we prefer to use carbon tetrachloride, chloroform, trichloro-acetic acid and the corresponding iodo and bromo compounds, and the araliphatic representatives such cas $\omega,\omega'$-hexachloroxylene, decabromodiphenyl and decabromodiphenyl oxide.

The auxiliary liquids used in the special embodiment of the etherification process of the invention are, according to definition, those which contain no functional groups which could interfere with the course of the reaction or change its direction. Suitable liquids are those boiling in the range 25° to 180°C and preferably 30° to 150°C, such as toluene, benzene, dioxane, petroleum ethers boiling in the said range, cyclohexane and/or monomers such as vinyl derivatives, for example styrene, vinyl acetate, vinyl chloride, vinyl ethers and/or acrylic acid, methacrylic acid and/or derivatives thereof such as acrylamide, acrylonitrile, methyl acrylate, ethyl acrylate and butyl acrylate and the corresponding methacrylates, and maleic acid derivatives such as their esters with alcohol residues of from 1 to 10 carbon atoms, e.g. dimethyl maleate and dibutyl maleate, and low molecular weight condensates with polyfunctional alcohols no longer carrying any free hydroxyl groups.

Furthermore, the reaction of the invention may also be carried out in the presence of auxiliary polymers, particularly when the process is applied to high molecular weight products as is discussed below. Examples of such auxiliary polymers are polyvinyl carbazole, polystyrene, polyvinyl chloride, halogenated polyethylene or polypropylene, and copolymers of various monomers, which may be present, according to the invention, in the reaction mixtures in amounts of up to 25% by weight and preferably of from 0.5 to 5% by weight.

In addition, in order to allow the reaction to be carried out with less intense radiation, photosensitizers of the kind normally used in photochemical processes may be added to the reaction mixtures, examples being leuco malachite green, ethyl red, p-benzoquinone, anthraquinone, etc.

Suitable sources of radiation for use in the invention are all those used industrially for such purpose. Examples thereof are sources of electromagnetic radiation or light rays. The wavelengths used cover a broad spectrum and extend from gamma rays of less than 0.001 A to ultrared rays of more than 8,000 A units. It is convenient to use sources of radiation between 0.001 and 8,000 A and preferably between 0.1 and 6,000 A. For industrial purposes, the ultraviolet range of between 3,000 and 4,000 A is of greatest importance. It is also possible to carry out the reaction of the invention under the action of electric fields having a potential of from 1 to 100 kv. Finally, the process may be carried out in extremely short times when the reactants are bombarded with accelerated electrons ($\beta$-rays) having energies of from about 100 kev to 10 mev.

Particularly convenient sources of radiation for the process of the invention are those employed in industry for the emission of high-frequency electromagnetic rays, such as high pressure mercury vapor lamps, bright daylight lamps, fluorescent lamps X-ray tubes, radium preparations and cobalt-60 preparations, as well as natural sources of radiation such as sunlight, which are capable of emitting radiation in the preferred range as defined above. It is particularly convenient to use fluorescent lamps or high-pressure mercury vapor lamps, as in this case the process proceeds at a satisfactory rate. Where it is desired to employ the action of electric fields, the well-known phenomenon of dark electric discharges may be successfully used for our process.

The reactants are used in various proportions depending on the nature of the compound bearing the alcoholic hydroxyl groups. For reactions with low molecular weight compounds, stoichiometric amounts are used, i.e. one mole of ethylenically unsaturated compound must be present in the reaction mixture for each alcoholic hydroxyl group to be etherified.

In the case of high molecular weight compounds containing alcoholic hydroxyl groups, the ratio cannot be determined exactly, as is well known. However, it is advantageous to cause the high molecular weight material to be acted on by unsaturated compounds in an amount equivalent to an excess, to ensure that substantially 100% of the hydroxyl groups react.

The amount of organic halogen compound to be added may vary within wide limits. For example, as little as 0.001% by weight, based on the weight of ethylenically unsaturated compounds, is sufficient, but excesses of up to 100 times, based on the ethylenically unsaturated compounds, produce no changes in the course of the reaction. In such a case the halogenated compounds serve as solvents.

The auxiliary liquids used in the special embodiment of the invention may be present in amounts of up to 1,000% by weight of the weight of ethylenically unsaturated compounds. However, amounts of up to 2,000% by weight produce no significant change in the course of the reaction. The auxiliary polymers added in other embodiments may be present in amounts of, say, up to 25% when for example high molecular weight compounds containing alcoholic hydroxyl groups are being etherified, as is required for example in processes for rendering textiles water-repellent or for the preparation of photocopies as discussed below.

The photosensitizers, where required, are added in concentrations as are conventionally used for this class of substances in other fields of industry. In general, such concentrations range from 0.001 to 5% by weight of the weight of ethylenically unsaturated compounds.

Conventionally, the amount of total liquid added is from 1 to 50% by weight, i.e. about the same as the preferred range of concentrations of halogenated compounds.

The process of the invention may be carried out in a simple manner. For example, the reactants, halogenated compounds and any auxiliary liquids, auxiliary polymers and photosensitizers may be mixed in the prescribed proportions and photosensitizers may be mixed in the prescribed proportions and treated with one of the aforementioned types of high-energy radiation.

The duration of the reaction varies from less than one tenth of a second to one hour (in the extreme case where the tertiary amines used have only one carbonyl or C=C function in the position vicinal to the nitrogen atom). Preferably, the reaction takes place in from 5 to 30 seconds in the treatment of compounds of low molecular weights, and in less than 1/10th of a second in the preparation of photocopies. The temperature at which the reaction is carried out varies within wide limits. For example, it may range from −10° to +150°C, but it is preferred to carry out the process at temperatures of between 10° and 75°C and usually at room temperature.

When it is desired to convert the high molecular weight compounds containing alcoholic hydroxyl groups it is sufficient to brush on the solution of ethylenically unsaturated compound in conjunction with the halogenated compounds or to cause the solution to act on the high molecular weight compound in some other way, in order to achieve etherification. Such solutions will than have the compositions given above.

In the treatment of paper, this is dipped in the solution, for example, until it is fully impregnated, after which it is exposed to the radiation. Textile materials, e.g. materials based on cellulose, may be simply padded with the solution in the manner usually employed in the textile industry, and then subjected to the reaction of the invention. In the treatment of paints, wood or leather, the reaction of the invention is generally effected by simply brushing the said solution, which preferably contains the aforementioned auxiliary polymers, onto the substrate to be treated. If it is desired to exploit the reaction of the invention for the purpose of making photocopies, it is generally convenient to use a support based, for example, on metals or plastics materials and to dip this in the reactants, to which the aforementioned polymeric auxiliaries and, if necessary, sensitizers have been added. A plate coated in this manner may then be placed under the appropriate transparent film material and exposed to the radiation from one of the aforementioned sources.

In the last-named embodiment, the supports may be, say, anodized aluminum plates or plates of plastics material such as the commercially available plates known as "nyloprint" plates ("nyloprint" is a registered trade mark of Badische Anilin- & Soda-Fabrik AG, Germany). Plates which have been pretreated in this way may be used, for example, in offset printing techniques and yield excellent printed copies showing good resolution. Development of a plate processed in this way is very simple and is generally carried out by washing the exposed plate with hot water. In this manner the unreacted reactants are melted and thus removed from the plate whilst the etherified areas adhere firmly to the surface due to the fact that they have a much higher melting point and cannot therefore be melted by hot water. If, for example, the halogen compound used is a bromine or iodine compound, it is generally adequate to use an exposure time of less than 1 minute in order to produce plates for offset printing.

The process of the invention makes it possible to produce ether compounds in a minimum amount of time and in large yields. Although the process of the invention has a large range of applications and achieves results in a short time, it is surprisingly highly selective, since only the above-defined compounds are able to cause the reaction to take place at all or at a satisfactory rate. This may readily be seen from the fact that the use of monomeric ethylenically unsaturated compounds other than the auxiliary liquids defined above fails to cause the reaction to take place in the said short times. In order to obtain measurable conversions with the alcoholic components, when such monomers are used as auxiliaries, it is necessary to irradiate the mixture for days or weeks, as mentioned above, in which case some conversion may occur but this is below 1%.

Our etherification reaction is of great commercial significance in applications in the field of said polymeric compounds. The process makes it possible to render textiles and paper water-repellent for example. Leather, wood and paints may be given a water-proof coating using these solutions, since the free hydroxyl groups are provided with hydrophobic groups by the reaction of the invention. Materials which have been treated by the process of the invention are at least equal in water resistance characteristics to those materials which have been rendered water-repellent by prior art processes. Our process is also particularly significant for the manufacture of printing plates as shown above.

The following Examples illustrate the advantages of the invention and show how a technical problem can be tackled and solved from a new angle using extraordinarily simple means.

The invention is illustrated but not limited by the following Examples, in which the parts are by weight.

EXAMPLE 1

60 parts of N-vinyl carbazole are melted with 30 parts of methanol with the addition of 1 part carbon tetrachloride and are exposed to the radiation of Philips fluorescent lamps, type TLA 40W/05 (preferential emission of wavelengths of from 300 to 400 nn) for 5 seconds with cooling. The conversion to 1-methoxy-N-ethylcarbazole is 100% of theory. The product is filtered from the residual methanol and dried. It requires no further purification. M.p. 78°C.

EXAMPLE 2

60 parts of N-vinyl carbazole are melted with 30 parts of ethanol with the addition of 1 part of carbon tetrachloride and exposed to the radiation of fluorescent lamps as described in Example 1 for 30 seconds. Working up is effected by evaporating the residual ethanol in vacuo and separating the difficultly soluble carbazole (by-product of the reaction) with cyclohexane. The solution is evaporated down to give 1-ethoxy-N-ethylcarbazole in a yield of 65% M.p. 63–65°C.

EXAMPLE 3

Example 2 is repeated but using the appropriate reactants to produce 1-butoxy-N-ethylcarbazole in a yield of 85%. M.p. 40°C.

EXAMPLE 4

60 parts of N-vinyl carbazole are melted together with 30 parts of methanol and 1 part of chloroform and exposed and worked up as described in Example 1. 1-Methoxy-N-ethylcarbazole is obtained in a yield of 60% of theory.

EXAMPLES 5 to 9

Example 3 is repeated, but other halogen derivatives are used as sensitizers instead of chloroform, as indicated below.

| | | |
|---|---|---|
| Ex. 5 | Bromoform $CHBr_3$ | yield of methylethylene chloride 60%. |
| Ex. 6 | Methyl iodide $CH_3I$ | yield of methylethylene chloride 75%. |
| Ex. 7 | Methylene chloride $CH_2Cl_2$ | yield of methylethylene chloride 65%. |
| Ex. 8 | Hexachloro-ethane $C_2Cl_6$ | yield of methylethylene chloride 60%. |
| Ex. 9 | Trichloro-acetic acid $CCl_3COOH$ | yield of methylethylene chloride 55%. |

EXAMPLE 10

60 parts of N-vinylpyrrolidone, 30 parts of methanol and 1 part of carbon tetrachloride are irradiated for 30 seconds using Philips fluorescent lamps Type TLA 40W/05. The residual methanol is distilled off. The ether is produced in a yield of about 60%.

EXAMPLE 11

Paper substantially consisting of cellulose is impregnated with a solution of 3 parts of N-vinyl carbazole, 25 parts of carbon tetrachloride and 75 parts of toluene and irradiated on both sides for 30 seconds using fluorescent lamps. The paper is rendered water-repellent due to the etherification of the hydroxyl groups. The hydrophobic character is not removed by washing the paper a number of times with hot methylene chloride. A measure of the water resistance is given by the ink penetrating time using a specific ink to which ethylene glycol and water have been added.

COMPARATIVE TEST

| Material | Ink penetrating time (sec) |
| --- | --- |
| untreated paper | 0 |
| paper treated by the invention | 510 |
| commerically available water-proofed paper (impregnated with polymer dispersions) | 5 |

WATER-REPELLENT EFFECT AS A FUNCTION OF THE CONCENTRATION of N-VINYL CARBAZOLE IN THE IMPREGNATING LIQUOR

| % Conc. of N-vinyl carbzole in solution | Ink penetrating time (sec) |
| --- | --- |
| 0.1 | 10 |
| 0.5 | 12 |
| 1.0 | 12 |
| 3.0 | 510 |
| 5.0 | 480 |
| 10.0 | 900 |
| 20.0 | >900 |
| 30.0 | >900 |

If the paper is previously dried (all moisture removed), the hydrophobic effect achieved may be increased by a factor of from 2 to 10. If exposure is made with radiation of higher intensity, for example with high-pressure mercury vapor lamps (HPK 125 W), an exposure time of 5 sec. is sufficient.

EXAMPLE 12

Using the same mixtures of described in Example 11, cotton fabrics are impregnated and exposed on both sides to the radiation of fluorescent lamps for 30 seconds. A measure of the hydrophobic effect is given by the height to which water rises in the fabric.

HYDROPHOBIC EFFECT OBTAINED IN COTTON FABRIC AS A FUNCTION OF THE CONCENTRATION OF N-VINYL CARBAZOLE IN THE IMPREGNATING LIQUOR

| % Conc. of N-vinyl carbazole | Height of rise (cm) | Height of rise after elutriation with acetone (cm) |
| --- | --- | --- |
| 0 | 8 | 8 |
| 0.1 | 6 | 6.5 |
| 0.5 | 1.7 | 4.5 |
| 1.0 | 0.3 | 3.8 |
| 3.0 | 0.3 | 0.5 |

Here again, if the fabric is dried out (for 30 seconds at 150°C) the hydrophobic effect is increased, and the exposure time may be reduced to 5 sec. when high-pressure mercury lamps are used.

EXAMPLE 13

A solution of 3 parts of N-vinyl carbazole and 25 parts of carbon tetrachloride in 25 parts of toluene is used to impregnate chamois leather, which is then irradiated on both sides for from 30 seconds to 3 minutes using fluorescent lamps as described in Example 11.

The hydrophobic effect achieved may be clearly seen from the increase in the tensile strength of the leather when wet. This is determined by dipping test strips having a width of 2 cm and a length of 10 cm in distilled water at 25°C for 5 minutes and then measuring the tensile strength of the undried test strips.

TENSILE STRENGTH OF SURFACE-TREATED LEATHER

| Sample | untreated | impregnated and exposed for | | |
| --- | --- | --- | --- | --- |
| | | 30" | 60" | 3' |
| Tensile strength (kg/cm$^2$) | 42.5 | 97.5 | 87.6 | 60 |

EXAMPLE 14

A mixture of 5 parts of N-vinyl carbazole, 5 parts of an unsaturated polyester (polyethylene glycol maleate - OH value 50) in the form of a 60% solution is styrene, 20 parts of carbon tetrachloride and 70 parts of styrene is used to impregnate untreated wood surfaces which have been predried if necessary, which surface are then irradiated for 5 minutes using fluorescent lamps as described in Example 11. This treatment improve the surface of the wood and produces a distinct increase in the water resistance thereof.

EXAMPLE 15

The process of Example 11 is repeated for the treatment of a 100/μ thick film of polyvinyl alcohol. The material is rendered water-repellent thereby.

EXAMPLE 16

60 parts of N-vinyl carbazole, 30 parts of n-propanol and 1 part of carbon tetrachloride are melted and carefully irradiated using Philips fluorescent lamps TLA 40w/05/min with cooling. The residual n-propanol is then distilled off in a rotary evaporator at approx. 60°C under a pressure of approx. 3 mm of Hg. The residue is left to stand in about three times its weight of cyclohexane for about 12 hours, whereupon the precipitated carbazole is filtered off. The filtrate is concentrated to give a very viscous oil which, according to n.m.r. analysis, has a chemical structure complying to the propyl ether of 1-hydroxy-N-ethylcarbazole.

EXAMPLES 17 and 18

Example 16 is repeated but using different alcohols in place of n-propanol as indicated below.

Ex. 17 Isopropanol is used to give the isopropyl ether of 1-hydroxy-N-ethylcarbazole.

Ex. 18 t-Butanol is used to give the t-butylether of 1-hydroxy-N-ethylcarbazole.

EXAMPLE 19

Anodized aluminum sheeting is dipped in a 1% aqueous solution of starch of polyvinyl alcohol and, after drying, coated with the following solution:

|  | parts |
|---|---|
| N-vinyl carbazole | 100 |
| poly-N-vinyl carbazole (K-value approx. 65) | 10 |
| ω,ω'-hexachloroxylene | 30 |
| toluene | 900 |

The plate is exposed for 2 minutes with Philips fluorescent lamps TLA 40w/05 through a test negative, and all of the exposed areas of the coated aluminum plate show etherification of the starch or polyvinyl alcohol. The remaining unreacted N-vinyl carbazole is melted and washed off with hot water (60–80°C). The areas in which the starch or polyvinyl alcohol has been etherified are water-repellent and take printing ink. The plate may then be used for offset printing and gives an excellent print showing good resulution.

The photochemical sensitivity of the system is below 360 nm.

EXAMPLE 20

Example 19 is repeated except that the mixture is sensitized with 2 parts of iodoform in place of the 30 parts of hexachloroxylene.

The exposure time of the aluminum plates thus coated is reduced from 2 minutes (Example 19) to 15 seconds.

The photochemical sensitivity of the system is below 50 nm.

EXAMPLE 21

Example 20 is repeated except that additional sensitization is achieved by adding 1 part of leuco cyrstal violet and 0.5 part of p-benzoquinone to the mixture. The exposure time is 5 sec. and the photochemical sensitivity is below 600 nm.

EXAMPLES 22 and 23

Example 21 is repeated but using other dye bases in place of leuco crystal violet:

Ex. 22 leuco malachite green    exposure time 5 sec;

Ex. 23 ethyl red    exposure time 5 sec.

EXAMPLE 24

Paper substantially consisting of cellulose is impregnated with a solution of 3 parts of N-vinyl carbazole in 97 parts of carbon tetrachloride and then exposed to an electric discharge. The equipment used was that known as "Vetapone" sheet pretreaters using a potential of 2,400 v at a current of 0.7 ma. The paper was passed through the equipment a number of times and thus rendered hydrophobic. Ink penetrating times are given below as a function of the number of passes through the equipment:

| No. of passes at approx. 8 m/min | Ink penetrating time (sec) |
|---|---|
| 2 | about 120 |
| 10 | do. 180 |
| 20 | do. 120 |
| 0 | 3 |

EXAMPLES 25

Example 24 is repeated except that N-vinyl carbazole is replaced by 3,3-dimethyl-N-vinyl-dihydro-oxazine. This mixture also renders the paper hydrophobic in this process.

We claim:

1. A process for the etherification of compounds bearing alcoholic hydroxyl groups selected from the group consisting of monohydric, aliphatic saturated or unsaturated alcohols of from 1 to 8 carbon atoms in which the hydroxyl group is attached to one of the aliphatic carbon atoms; polyhydric alcohols of from 2 to 12 carbon atoms, cellulose, starch, polyvinyl alcohol, polyesters containing alcoholic hydroxyl groups, proteins containing free hydroxyl groups, terpene alcohols and steroids by causing ethylenically unsaturated compounds to act on the compounds bearing alcoholic hydroxyl groups under the action of high energy radiation, wherein the compounds bearing alcoholic hydroxyl groups are reacted with tertiary amines of the following formulae

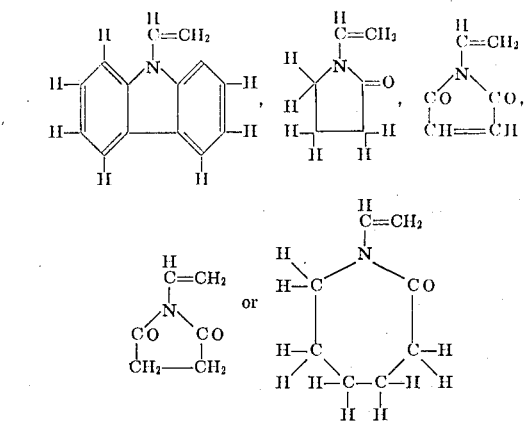

said reaction being carried out in the presence of organic halogen compounds containing one or more halogen atoms attached to aliphatic carbon atoms, said reaction being carried out for from 1/10 second to 1 hour whereby said compounds bearing alcoholic hydroxyl groups are etherified.

2. A process as set forth in claim 1, wherein the reaction is carried out in the presence of auxiliary liquids which are inert to the reactants under the conditions of the reaction and boil at temperatures between 25° and 180°C.

3. A process as set forth in claim 1, wherein the organic halogen compounds used are carbon tetrachloride, chloroform, trichloro-acetic acid and hexachloroxylene, decachlorophenyl, decachlorodiphenyl oxide and the corresponding iodine and bromine compounds.

4. A process as set forth in claim 1, wherein the compounds bearing alcoholic hydroxyl groups are selected from the group consisting of cellulose, polyvinyl alcohol, polyesters containing alcoholic hydroxyl groups, and proteins containing free hydroxyl groups.

5. A method of increasing the hydrophobic characteristics of textiles based on cellulose, paper based on cellulose, leather, wood or materials composed of polyesters containing free hydroxylic groups, comprising the application of the process set forth in claim 1 to said materials.

6. A process as set forth in claim 1 wherein the reaction is carried out at a temperature of from 10 to 75°C and wherein the reaction period is from 5 to 30 seconds.

* * * * *